United States Patent
Lii et al.

(10) Patent No.: US 9,791,762 B1
(45) Date of Patent: Oct. 17, 2017

(54) NONLINEAR OPTICAL CRYSTAL AND MANUFACTURING METHOD THEREOF

(71) Applicant: National Central University, Taoyuan (TW)

(72) Inventors: Kwang-Hwa Lii, Taoyuan (TW); Wen-Jung Chang, Taoyuan (TW); Bor-Chen Chang, Taipei (TW); Tzu-Ling Chao, Taichung (TW)

(73) Assignee: National Central University, Taoyuan (TW)

( * ) Notice: Subject to any disclaimer, the term of this patent is extended or adjusted under 35 U.S.C. 154(b) by 0 days.

(21) Appl. No.: 15/408,438

(22) Filed: Jan. 18, 2017

(30) Foreign Application Priority Data

Apr. 25, 2016 (TW) .............................. 105112844 A

(51) Int. Cl.
  *C01B 33/32* (2006.01)
  *G02F 1/355* (2006.01)

(52) U.S. Cl.
  CPC ............ *G02F 1/3551* (2013.01); *C01B 33/32* (2013.01); *C01P 2002/72* (2013.01); *C01P 2002/76* (2013.01); *C01P 2002/77* (2013.01)

(58) Field of Classification Search
  CPC .... G02F 1/3551; C01B 33/32; C01P 2002/76; C01P 2002/77; C01P 2002/72
  USPC ........ 252/301.5, 582; 372/21; 423/263, 277, 423/326, 703, 332
  See application file for complete search history.

(56) References Cited

U.S. PATENT DOCUMENTS

| | | |
|---|---|---|
| 5,406,409 A | 4/1995 | Harlamoff et al. |
| 5,594,592 A | 1/1997 | Harlamoff et al. |
| 5,795,555 A | 8/1998 | Alive et al. |
| 5,885,546 A | 3/1999 | Kumar et al. |
| 8,514,483 B2 | 8/2013 | Chen et al. |
| 2004/0024075 A1 | 2/2004 | Dongare et al. |
| 2005/0277304 A1 | 12/2005 | My Ali et al. |
| 2012/0063475 A1 | 3/2012 | Keszler et al. |

FOREIGN PATENT DOCUMENTS

| | | |
|---|---|---|
| CN | 101748476 A | 6/2010 |
| CN | 101974778 A | 2/2011 |
| TW | 201446651 A | 12/2014 |

OTHER PUBLICATIONS

Tzu-Ling Chao, Wen-Jung Chang, Shu-Han Wen, Yu-Qing Lin, Bor-Chen Chang, and Kwang-Hwa Lii, Titanosilicates with Strong Phase-Matched Second Harmonic Generation Responses, J. Am. Chem. Soc. 2016, 138, 9061-9064.*

(Continued)

*Primary Examiner* — Bijan Ahvazi
(74) *Attorney, Agent, or Firm* — CKC & Partners Co., Ltd.

(57) ABSTRACT

A nonlinear optical crystal has a chemical formula $Li_2X_4TiOSi_4O_{12}$, wherein X=K or Rb. The nonlinear optical crystal belongs to tetragonal system with space group P4nc and Z=2. The unit cell parameters of $Li_2K_4TiOSi_4O_{12}$ are $a=b=11.3336(5)$ Å, $c=5.0017(2)$ Å; and the unit cell parameters of $Li_2Rb_4TiOSi_4O_{12}$ are $a=b=11.5038(6)$ Å, $c=5.1435(3)$ Å. The two crystals are thermally stable and show strong second harmonic generation with high laser damage threshold.

10 Claims, 8 Drawing Sheets

(56) References Cited

OTHER PUBLICATIONS

Hiromichi Hayashi, et al., "Hydrothermal Synthesis of Metal Oxide Nanoparticles in Supercritical Water", Materials 2010, 3(7), Jun. 25, 2010, pp. 3794-3817.
Zeng Huidan et al., "Preparation of Glass Doped with Oriented Nonlinear Crystals", Journal of the Chinese Ceramic Society, vol. 41, No. 4, Apr. 2013, p. 467-474.

* cited by examiner

NONLINEAR OPTICAL CRYSTAL AND MANUFACTURING METHOD THEREOF

RELATED APPLICATIONS

This application claims priority to Taiwan Application Serial Number 105112844, filed on Apr. 25, 2016, which is herein incorporated by reference.

BACKGROUND

Generally speaking, when light passes through a medium, optical phenomena such as incidence, reflection or refraction occur. However, the intensity of laser beam is extremely high and is coherent, and the nonlinear response relevant to the polarization of a material will induce an electric field to light waves when laser wave passes through the material. It might generate harmonic waves from incident light waves at the sum frequency and beat frequency. The effect which is different from linear optical phenomena is called nonlinear optical effects. The crystals having nonlinear optical properties are called nonlinear optical crystals.

One of the most basic and important nonlinear optical effect is the change of the frequency of light. Nonlinear optical crystals can be used to change a fixed frequency of a laser to different frequencies by processes of double frequency, sum frequency, beat frequency or optical parametric amplification. The second harmonic generation generated by doubling frequency of nonlinear optical effects has widespread applications in the application of laser.

Nonlinear optical crystals have very important applications in laser technology. Nonlinear optical crystals can be applied to scientific research, high power lasers, laser medical cosmetology and national defense technology. Only a few nonlinear optical crystals have been successfully commercialized, and thus there is still a need for new nonlinear optical crystals for various applications.

CONTENTS OF THE INVENTION

In accordance with embodiments of the present invention, a nonlinear optical crystal of the formula $Li_2X_4TiOSi_4O_{12}$ is provided, wherein X=K or Rb.

In accordance with embodiments of the present invention, a nonlinear optical crystal of the formula $Li_2K_4TiOSi_4O_{12}$ is provided, wherein the nonlinear optical crystal belongs to tetragonal system, space group thereof is P4nc, Z=2 and the unit cell parameters are a=b=11.3336(5) Å, c=5.0017(2) Å.

In accordance with embodiments of the present invention, a nonlinear optical crystal of the formula $Li_2Rb_4TiOSi_4O_{12}$ is provided, wherein the nonlinear optical crystal belongs to tetragonal system, space group thereof is P4nc, Z=2 and the unit cell parameters are a=b=11.5038(6) Å, c=5.1435(3) Å.

In accordance with embodiments of the present invention, a flux growth method of manufacturing a nonlinear optical crystal including mixing LiF, XF, $TiO_2$ and $SiO_2$ to form a first starting reagent; heating the first starting reagent to a first temperature to melt the first starting reagent and to undergo a reaction; and cooling down the first starting reagent from the first temperature to a second temperature to crystallize a nonlinear optical crystal represented by the formula $Li_2X_4TiOSi_4O_{12}$, wherein X=K or Rb.

In some embodiments, the molar ratio of Li:K:Ti:Si in the first starting reagent is equal to a:b:1:1-4, wherein a and b are between 10-30.

In some embodiments, the molar ratio of Li:Rb:Ti:Si in the first starting reagent is equal to a:b:1:1-4, wherein a and b are between 10-30.

In some embodiments, the first temperature is between 650° C. and 900° C., and the second temperature is between 550° C. and 700° C.

In accordance with embodiments of the present invention, a method of manufacturing a nonlinear optical crystal is provided, including mixing $LiOH.H_2O$, KOH, $TiO_2$, $SiO_2$ and $H_2O$ to form a second starting reagent; heating the second starting reagent to a third temperature to undergo a high-temperature, high-pressure hydrothermal reaction at the third temperature to form a supersaturated solution comprising $Li_2K_4TiOSi_4O_{12}$; and cooling down the second starting reagent from the third temperature to a fourth temperature to crystallize a nonlinear optical crystal represented by the formula $Li_2K_4TiOSi_4O_{12}$.

In some embodiments, the molar ratio of $LiOH.H_2O$:KOH:$TiO_2$:$SiO_2$:$H_2O$ in the second starting reagent is equal to 2:10:1:4:10.

In some embodiments, the third temperature is between 450° C. and 550° C., and the fourth temperature is between 300° C. and 350° C.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
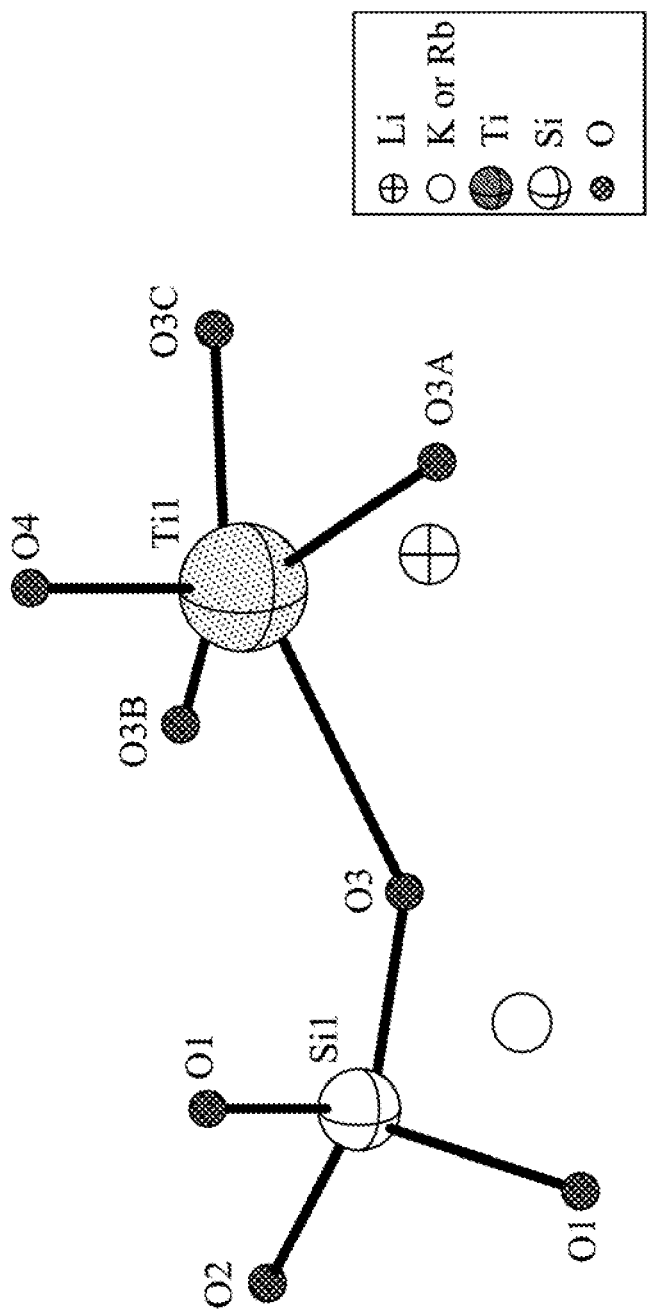
FIG. 1 illustrates an ORTEP drawing of a nonlinear optical crystal structure, in accordance with some embodiments of the present invention.

The following disclosure will discuss the way to use and manufacture the embodiments. However, it should be recognized that the present invention provides innovative concept in practice, which can be presented by wide variety of specific contents. The following discussion is intended to be illustrative and is not intended to limit the scope of the present invention. The following disclosure provides many different embodiments, or examples, for implementing different features of the provided subject matter. Specific examples of components and arrangements are described below to simplify the present disclosure. These are, of course, merely examples and are not intended to be limiting.

Embodiments relate to the nonlinear optical crystals and the manufacturing method thereof are provided, which describe the crystal structure, crystal data, manufacturing procedures and operations of the nonlinear optical crystals.

The present invention discloses a nonlinear optical crystals $Li_2X_4TiOSi_4O_{12}$, wherein X=K or Rb. In one embodiment, the formula of the nonlinear optical crystal is $Li_2K_4TiOSi_4O_{12}$ (LKTS). The space group was determined as P4nc (No. 104) based on extinction conditions and statistics of intensity distribution of the diffraction data which were collected with a single crystal X-ray diffractometer. The initial structural model was determined by direct method, then the atomic positions and the atom displacement parameters were calculated by the least-square refinement. Ti, Si and K atoms were determined firstly and the remaining O and Li atoms were located in the difference Fourier maps. The final cycles of the least-squares refinement included the atomic positions and anisotropic atom displacement parameters. The final refinement results were $R_1=0.0130$ and $wR_2=0.0393$. The largest peak and hole in the final difference Fourier maps were 0.243 e·Å$^{-3}$ and $-0.468$ e·Å$^{-3}$, respectively.

In another embodiment, the formula of the nonlinear optical crystal is $Li_2Rb_4TiOSi_4O_{12}$ (LRTS). The space group of LRTS was determined as P4nc (No. 104) based on the extinction conditions and statistics of intensity distribution of the diffraction data which were collected with a single crystal X-ray diffractometer. The procedures of structural analysis were similar to those for LKTS. The final refinement results were $R_1=0.0179$ and $wR_2=0.0397$. The largest peak and hole in the final difference Fourier maps were 0.488 e·Å$^{-3}$ and $-0.468$ e·Å$^{-3}$, respectively. The crystal data and structure refinement results for LKTS and LRTS are shown in Table 1.

TABLE 1

Crystal data and structure refinement for LKTS and LRTS

| Empirical formula | $Li_2K_4TiOSi_4O_{12}$ (LKTS) | $Li_2Rb_4TiOSi_4O_{12}$ (LRTS) |
| --- | --- | --- |
| Formula weight | 5385.4 | 724.02 |
| Crystal system | Tetragonal | Tetragonal |
| Space group | P4nc (No. 104) | P4nc (No. 104) |
| Unit cell dimesions | a = 11.3336(5) Å | a = 11.5038(6) Å |
| | b = 11.3336(5) Å | b = 11.5038(6) Å |
| | c = 5.0017(2) Å | c = 5.1435(3) Å |
| Volume | 642.47(5) Å$^3$ | 680.68(6) Å$^3$ |
| Z | 2 | 2 |
| Density (calculated) | 2.784 Mg/m$^3$ | 3.532 Mg/m$^3$ |
| F(000) | 528 | 672 |
| Theta range for data collection | 2.54° to 28.29° | 2.50° to 28.40° |
| Index ranges | $-15 <= h <= 14$ | $-15 <= h <= 14$ |
| | $-15 <= k <= 14$ | $-15 <= k <= 14$ |
| | $-6 <= l <= 6$ | $-6 <= l <= 6$ |
| Reflections collected | 11697 | 6955 |
| Independent reflections | 793[R(int) = 0.0194] | 736 [R(int) = 0242] |
| Goodness-of-fit on F2 | 1.222 | 1.218 |
| Final R indices [I>2sigma(I)] | $R_1 = 0.0130$, $wR_2 = 0.0393$ | $R_1 = 0.0179$, $wR_2 = 0.03972$ |
| Absolute structure parameter | 0.04(3) | 0.007(10) |

TABLE 1-continued

Crystal data and structure refinement for LKTS and LRTS

| Empirical formula | $Li_2K_4TiOSi_4O_{12}$ (LKTS) | $Li_2Rb_4TiOSi_4O_{12}$ (LRTS) |
| --- | --- | --- |
| Extinction coefficient | NA | 0.0086(5) |
| Largest diff. peak and hole | 0.243 and $-0.468$ e·Å$^{-3}$ | 0.488 and $-0.570$ e·Å$^{-3}$ |

FIG. 1 illustrates an ORTEP drawing of the nonlinear optical crystal structure, in accordance with some embodiments of the present invention. The asymmetric unit of the nonlinear optical crystal structure comprises a Ti atom, a Si atom, eight O atoms, a Li atoms and a K atom (K can be replaced by Rb). The structure of TiO$_5$ square pyramid consists of a Ti atom and five O atoms and the coordination number of Ti is five. A SiO$_4$ tetrahedron consists of a Si atom and four O atoms. The TiO$_5$ square pyramid and the SiO$_4$ tetrahedron share one O atom.

Figure 2A:
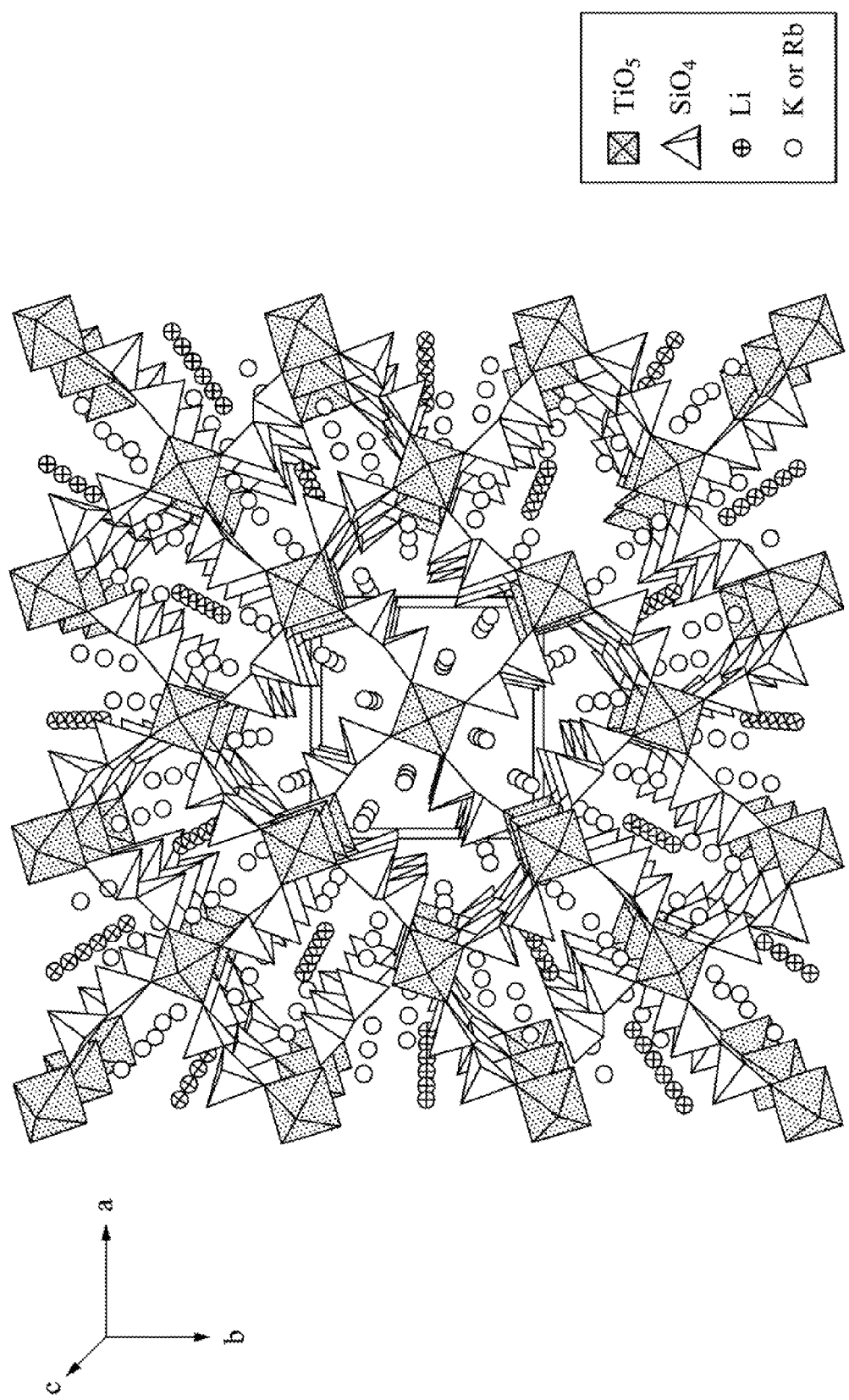
FIG. 2A illustrates the top view of an ab plane of the nonlinear optical crystal structure, in accordance with some embodiments of the present invention.
Figure 2B:
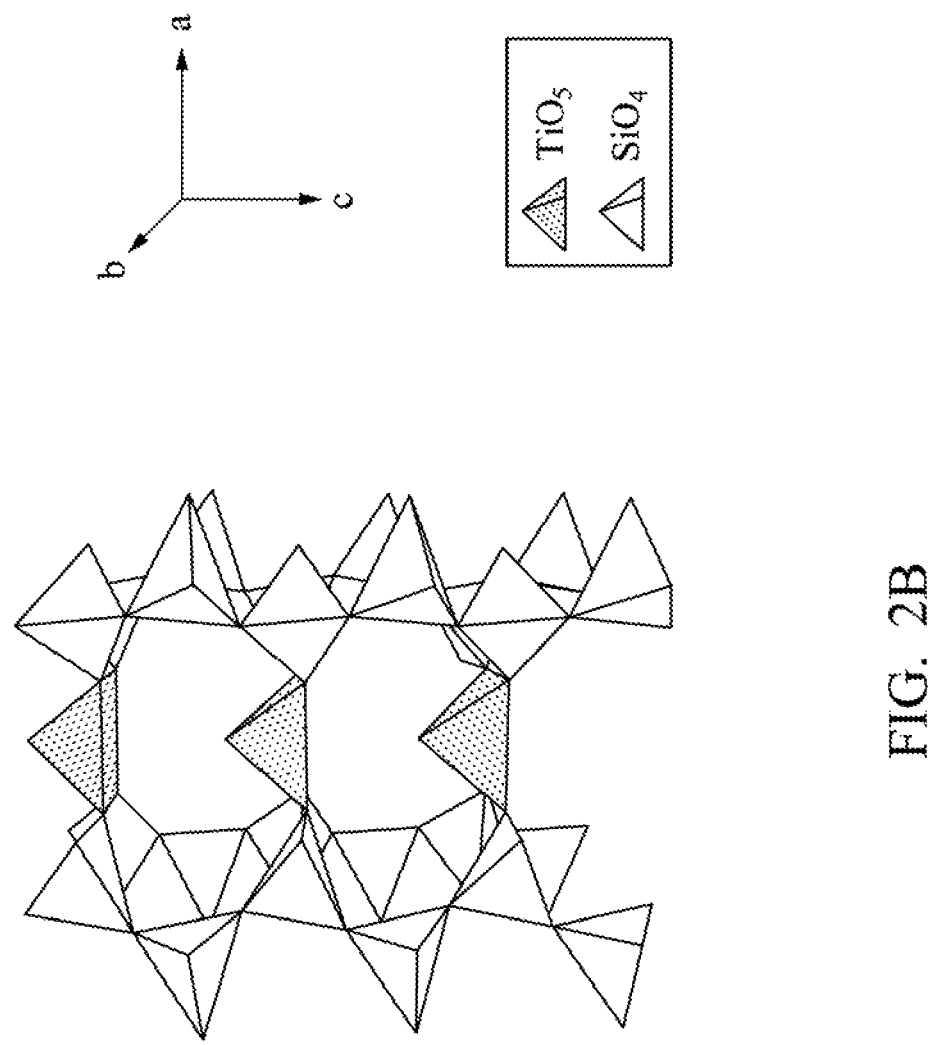
FIG. 2B illustrates the connectivity between $TiO_5$ and silicate chain in the crystal structure of the nonlinear optical crystal material, in accordance with some embodiments of the present invention.
Figure 2C:
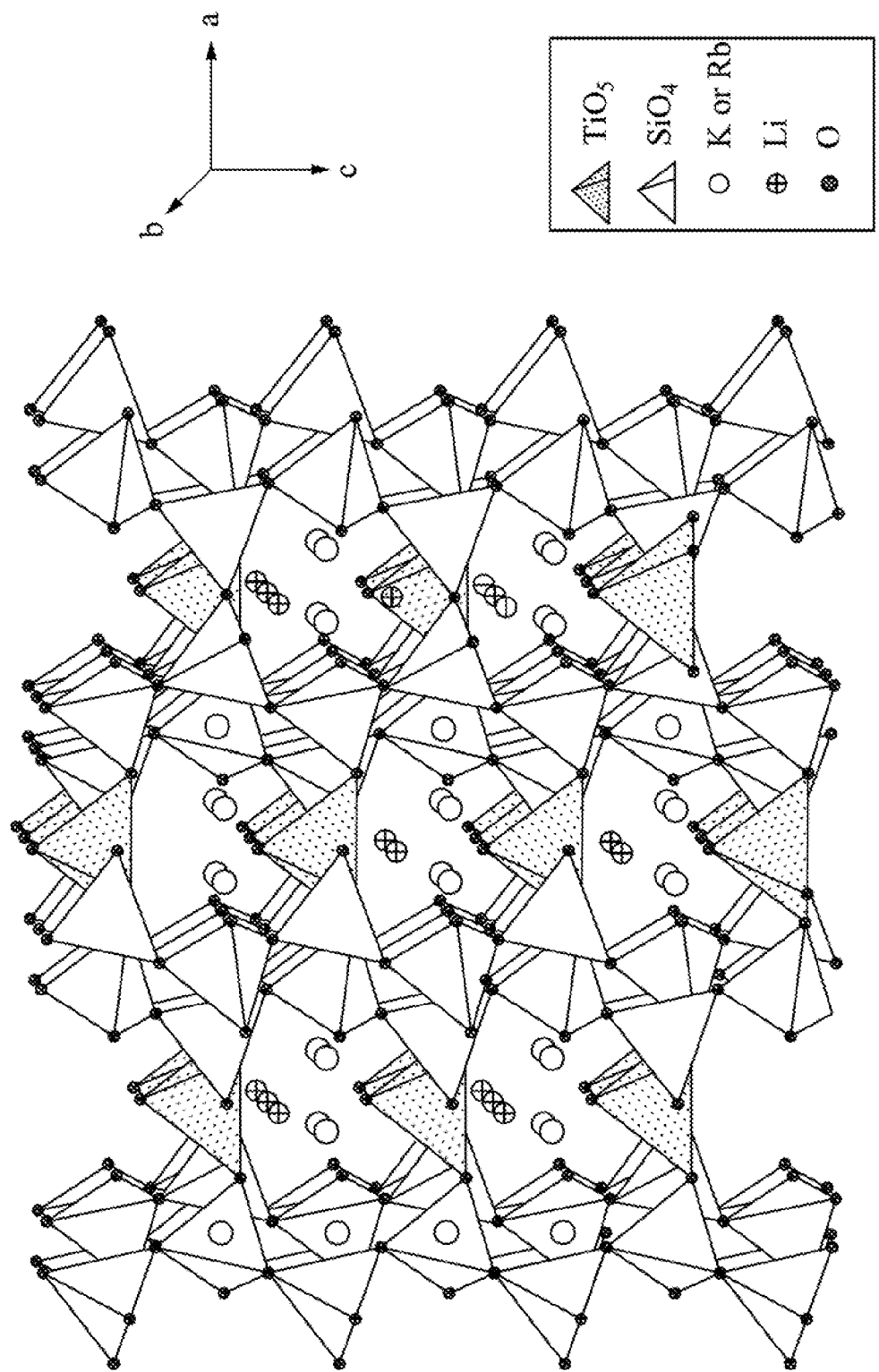
FIG. 2C illustrates the top view of an ac plane of the nonlinear optical crystal structure, in accordance with some embodiments of the present invention.

FIG. 2A illustrates the top view of an ab plane of the nonlinear optical crystal structure, in accordance with some embodiments of the present invention. Each of the four corners of the basal plane of TiO$_5$ square pyramid is connected with an adjacent SiO$_4$ tetrahedron. The apical corners (04 atom) of TiO$_5$ square pyramids are not connected with any SiO$_4$ tetrahedron and are directed toward the same direction. Li and K atoms (K can be replaced by Rb) are located at different sites in the structural channels. FIG. 2B illustrates the connectivity between TiO$_5$ and a silicate chain in the crystal structure of the nonlinear optical material, in accordance with some embodiments of the present invention. The silicate chain is formed by SiO$_4$ tetrahedra sharing two oxygen corners. Each of the four corners in the basal plane of the TiO$_5$ square pyramid is connected with an adjacent SiO$_4$ tetrahedron. FIG. 2C illustrates the top view of an ac plane of the nonlinear optical crystal structure, in accordance with some embodiments of the present invention. The silicate chain is formed by SiO$_4$ tetrahedra sharing two oxygen corners. Each of the four corners of the basal plane of TiO$_5$ square pyramid is connected with an adjacent SiO$_4$ tetrahedron. The apical corners (04 atom) of TiO$_5$ square pyramids are not connected with any SiO$_4$ tetrahedron and are directed toward the same direction, thus forming a • • • Ti—O • • • Ti—O straight chain. Li and K atoms (K can be replaced by Rb) are located at different sites in the structural channels.

The specific embodiments of synthesizing the nonlinear optical crystals LKTS and LRTS are described below. In one embodiment, the nonlinear optical crystal LKTS was synthesized by a flux method. The starting reagent LiF, KF, TiO$_2$ and SiO$_2$ were ground and mixed thoroughly. The molar ratio of Li:K:Ti:Si in the starting reagent is a:b:1:1-4, wherein a and b are between 10-30. In one embodiment, a=b=10. In another embodiment, a=b=18. In another embodiment, a=b=20. In another embodiment, a=b=25. In yet another embodiment, a=b=30. A mixture of LiF and KF was used as the fluxes in the synthesis. The mixed starting reagent is heated above the eutectic point of the flux. The eutectic temperature of the mixed alkali metal fluorides can be found from the phase diagram of LiF and KF. For example, when LiF and KF are mixed in a 1:1 ratio, the melting point of the mixture is about 500° C. The melting point of the mixture will be higher than 500° C. if LiF and KF are mixed in any non-1:1 ratio. In other embodiments, a may be larger or smaller than b. Then, the reaction mixture was slowly cooled down so that the nonlinear optical crystal LKTS crystallized from the melt.

In some embodiments, the starting reagent LiF, KF, $TiO_2$ and $SiO_2$ was ground and mixed thoroughly. The molar ratio of Li:K:Ti:Si in the starting reagent is 18:18:1:3. The reaction mixture was contained in a Pt crucible, placed in a high temperature furnace and heated to a first temperature. The first temperature was between 650° C. and 900° C., such as 700° C., 750° C., 800° C. or 850° C. The furnace was maintained at a temperature for several hours, such as 6-24 hours. It is preferably 10-14 hours, such as 12 hours. Then, the mixture was cooled to a second temperature at a slow cooling rate. For example, the cooling rate was 0.2° C./hr to 5° C./hr. It is preferably 0.2° C./hr to 2° C./hr. The second temperature is between 550-700° C., such as 600° C. or 650° C. It is preferably 650-700° C. Afterwards, the mixture was cooled to room temperature by turning off the power of the furnace. Through suction filtration, washing with water and ethanol and drying, the product was obtained as colorless crystals along with a small amount of white powder. The colorless crystals are LKTS and the yield is 78%. The white powder is undissolved LiF.

In some embodiments, the nonlinear optical crystal LKTS was synthesized by a hydrothermal method. The molar ratio of $LiOH.H_2O:KOH:TiO_2:SiO_2:H_2O$ in the starting reagent was 2:10:1:4:10. The starting reagent was sealed in a gold ampule, placed in a high-pressure vessel and heated to a third temperature. The third temperature was between 450-550° C., such as 500° C. The reaction was performed under supercritical hydrothermal conditions for 36-96 hours. It is preferably 60-84 hours, such as 72 hours. Then, the mixture was cooled down to a fourth temperature at a slow cooling rate. For example, the cooling rate was 3° C./hr to 8° C./hr. It is preferably 1° C./hr to 6° C./hr. It is better 2° C./hr to 4° C./hr. The fourth temperature is between 300-350° C., such as 310° C., 320° C., 330° C. or 340° C. Afterwards, the pressure vessel was cooled to room temperature by turning off the power of the furnace. Through suction filtration, washing with water and ethanol and drying, the product was obtained as colorless crystals of LKTS, as indicated by powder X-ray diffraction.

In another embodiment, the nonlinear optical crystal LRTS was synthesized by a flux method. The starting reagents LiF, RbF, $TiO_2$ and $SiO_2$ were ground and mixed thoroughly. The molar ratio of Li:Rb:Ti:Si in the starting reagent was c:d:1:1-4, wherein c and d were between 10-30. In one embodiment, c=d=10. In another embodiment, c:d=17:19. In another embodiment, c=d=18. In another embodiment, c=d=20. In another embodiment, c=d=25. In yet another embodiment, c=d=30. A mixture of LiF and RbF was used as the flux in the synthesis. The mixed starting reagents were contained in a Pt crucible, heated above the eutectic point of the flux. The eutectic temperature of the mixed starting reagent can be obtained from the phase diagram of LiF and RbF. For example, when LiF and RbF are mixed in a ratio of 17:19, the melting point of the mixture is about 475° C. The melting point of the mixture is higher than 475° C. if LiF and RbF are mixed in any non-17:19 ratio. But in other embodiments, the ratio of c:d may not be equal to 17:19. Then, the reaction mixture was slowly cooled so that the nonlinear optical crystal LRTS crystallized from the melt.

In some embodiments, the starting reagents LiF, RbF, $TiO_2$ and $SiO_2$ were ground and mixed thoroughly. The molar ratio of Li:Rb:Ti:Si in the starting reagent is 17:19:1:3. The reaction mixture was contained in a Pt crucible, placed in a high temperature furnace and heated to a first temperature. The first temperature was between 650° C. and 900° C., such as 700° C., 750° C., 800° C. or 850° C. The furnace was maintained at a temperature for several hours, such as 6-24 hours. It is preferably 10-14 hours, such as 12 hours. Then, the reaction mixture was cooled to a second temperature at a slow cooling rate. For example, the cooling rate was about 0.2° C./hr to 5° C./hr. It is preferably about 0.2° C./hr to 2° C./hr. The second temperature was between 550-700° C., such as 600° C. or 650° C. It is preferably 650-700° C. Afterwards, the reaction mixture was cooled to room temperature by turning off the power of the furnace. Through suction filtration, washing with water and ethanol and drying, the product contained colorless crystals of LRTS along with a small amount of white powder of undissolved LiF, as indicated by powder X-ray diffraction.

Table 2a lists the ratio of the starting reagents of the LKTS embodiments a-d in the present invention. The colorless crystals and white powder were synthesized by the methods described above. Then the composition of the colorless crystal obtained in the embodiment c and the white powder of the embodiments a-d were analyzed by the powder X-ray diffraction.

TABLE 2A

The starting reagent ratio of LKTS analyzed by powder X-ray diffraction

| LKTS Embodiments | Ratio of the starting reagent | | | |
|---|---|---|---|---|
| | LiF | KF | $TiO_2$ | $SiO_2$ |
| a | 18 | 18 | 1 | 1 |
| b | 18 | 18 | 1 | 2 |
| c | 18 | 18 | 1 | 3 |
| d | 18 | 18 | 1 | 4 |

Figure 3A:
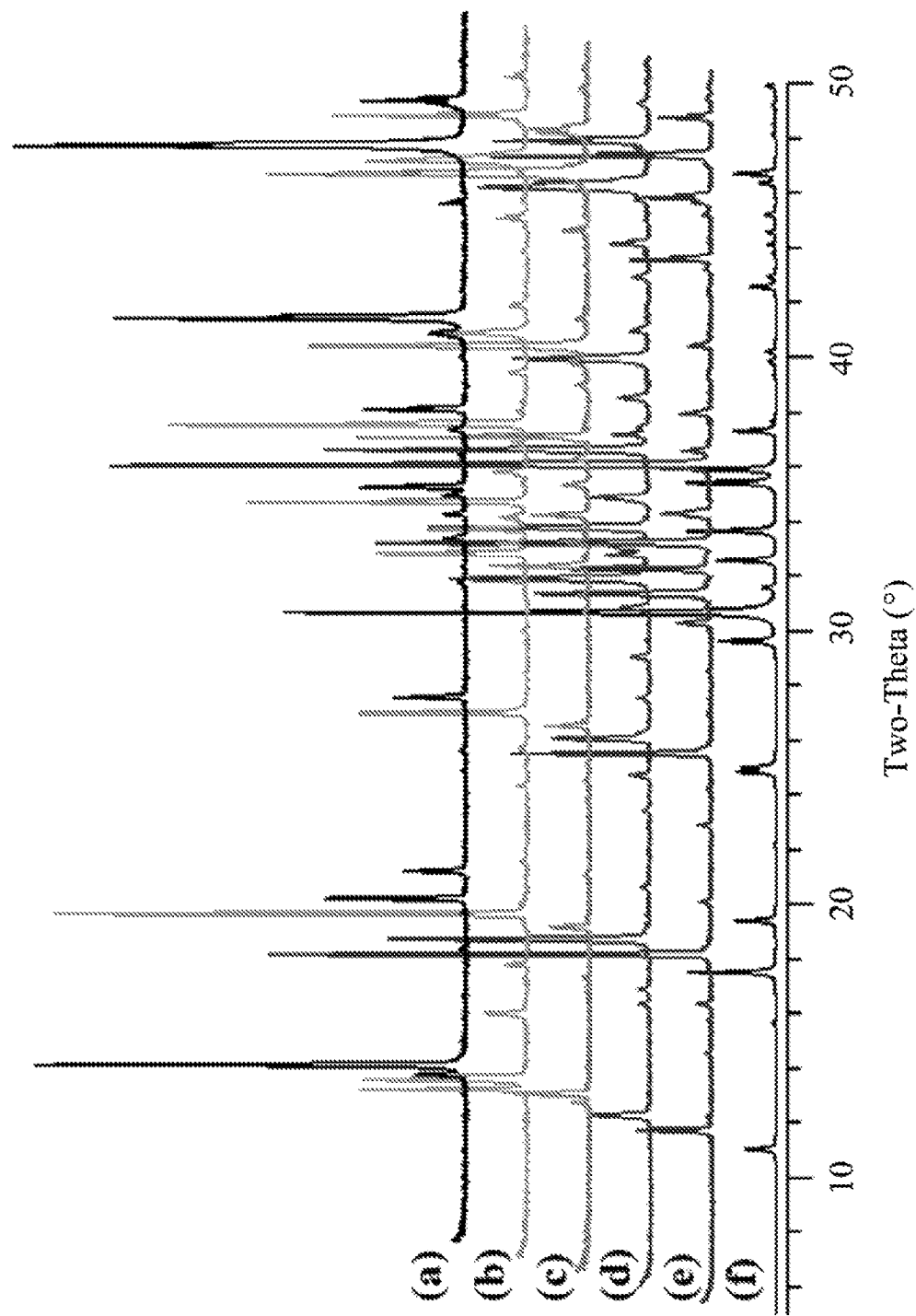
FIG. 3A is a powder X-ray diffraction pattern of the nonlinear optical crystal $Li_2K_4TiOSi_4O_{12}$, in accordance with some embodiments of the present invention.

FIG. 3A is the powder X-ray diffraction patterns of a nonlinear optical crystal $Li_2K_4TiSi_4O_{12}$, in accordance with some embodiments of the present invention. The pattern f of FIG. 3A is the theoretical powder pattern of the nonlinear optical crystal LKTS. The pattern e of FIG. 3A is the experimentally measured powder pattern of the colorless crystals. The measured powder pattern is in good agreement with the theoretical powder pattern.

In FIG. 3A, the powder patterns a-d correspond to the white powder obtained from the embodiments a-d in Table 2a. In the powder X-ray diffraction patterns, the diffraction peaks at about $2\theta=39°$ and $2\theta=45°$ are due to LiF. The white powders contains mainly undissolved LiF and other byproducts. Quantitative analysis can be achieved by powder X-ray diffraction. The relative amount of the components in a multi-phasic sample can be determined by the relative intensity of the reflections in the powder pattern. By comparing the powder patterns a-d of FIG. 3A, it can be concluded that the LiF content of the embodiment c (LiF: $KF:TiO_2:SiO_2=18:18:1:3$) is higher.

Table. 2b lists the ratio of the starting reagent of the LRTS embodiments a-d in the present invention. The colorless crystal and white powder were synthesized by method described above. Then the colorless crystal obtained in the embodiment c and the white powder of the embodiments a-d were characterized by powder X-ray diffraction.

TABLE 2B

The starting reagent ratio of LRTS analyzed by powder X-ray diffraction

| LRTS Embodiments | Ratio of the starting reagent | | | |
|---|---|---|---|---|
| | LiF | RbF | $TiO_2$ | $SiO_2$ |
| a | 17 | 19 | 1 | 1 |
| b | 17 | 19 | 1 | 2 |
| c | 17 | 19 | 1 | 3 |
| d | 17 | 19 | 1 | 4 |

Figure 3B:
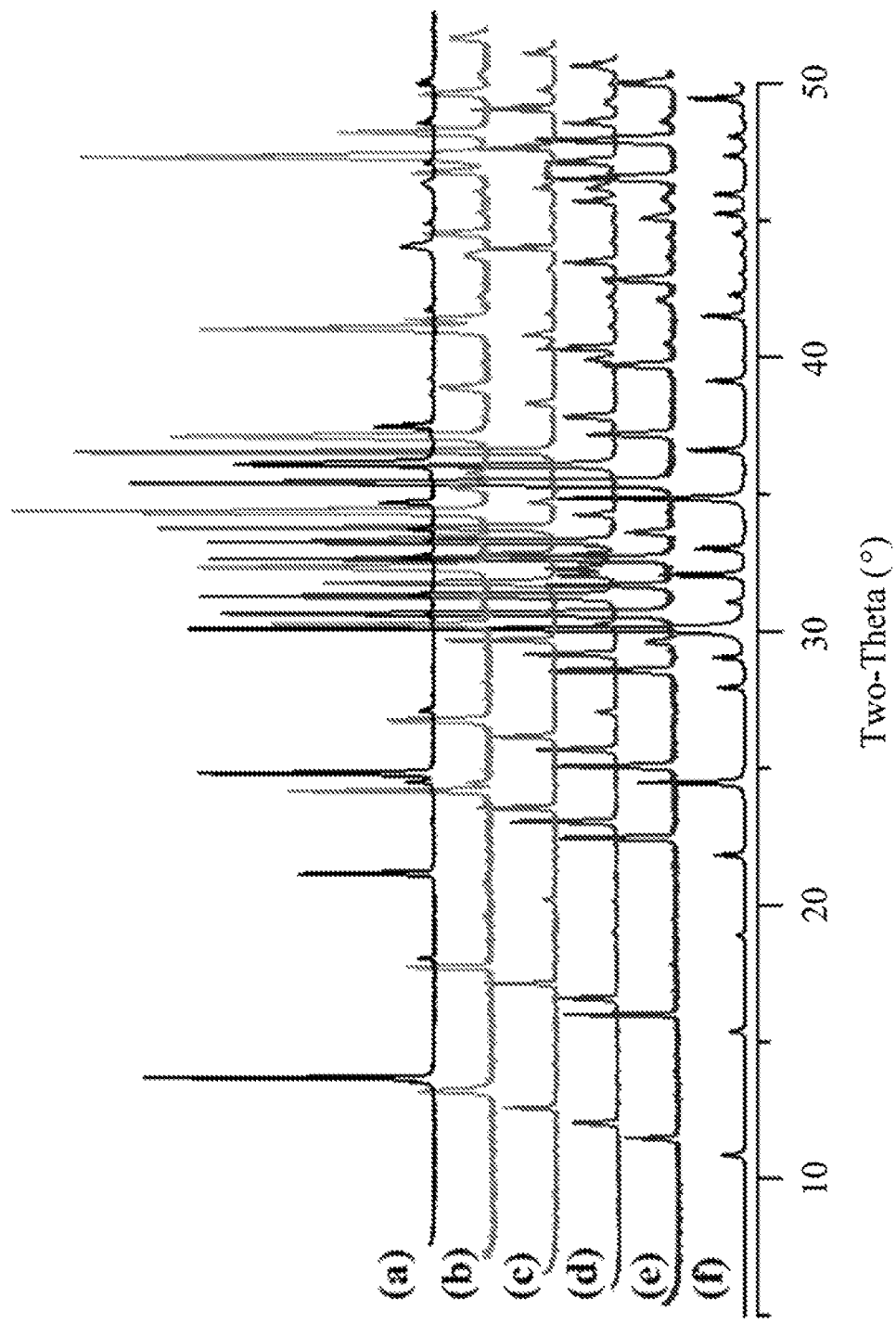
FIG. 3B is a powder X-ray diffraction pattern of the nonlinear optical crystal $Li_2Rb_4TiOSi_4O_{12}$, in accordance with some embodiments of the present invention.

FIG. 3B is the powder X-ray diffraction patterns of the nonlinear optical crystal $Li_2Rb_4TiOSi_4O_{12}$, in accordance with some embodiments of the present invention. The pattern f of FIG. 3B is the theoretical powder pattern of the nonlinear optical crystal LKTS. The pattern e of FIG. 3B is the experimentally measured powder pattern of the colorless crystals. The measured powder pattern is in good agreement with the theoretical powder pattern.

In FIG. 3B, the powder patterns a-d correspond to the white powder obtained from the embodiments a-d in Table. 2b. In the X-ray powder diffraction patterns, the diffraction peaks at about $2\theta=39°$ and $2\theta=45°$ are due to LiF. The white powder contains mainly undissolved LiF and other byproducts. Quantitative analysis can be achieved by powder X-ray diffraction. The relative amount of the components in a multi-phasic sample can be determined by the relative intensity of the reflections in the powder pattern. By comparing the powder patterns a-d of FIG. 3B, it can be concluded that the LiF content of the embodiment c (LiF: $RbF:TiO_2:SiO_2=17:19:1:3$) is higher.

Figure 4A:
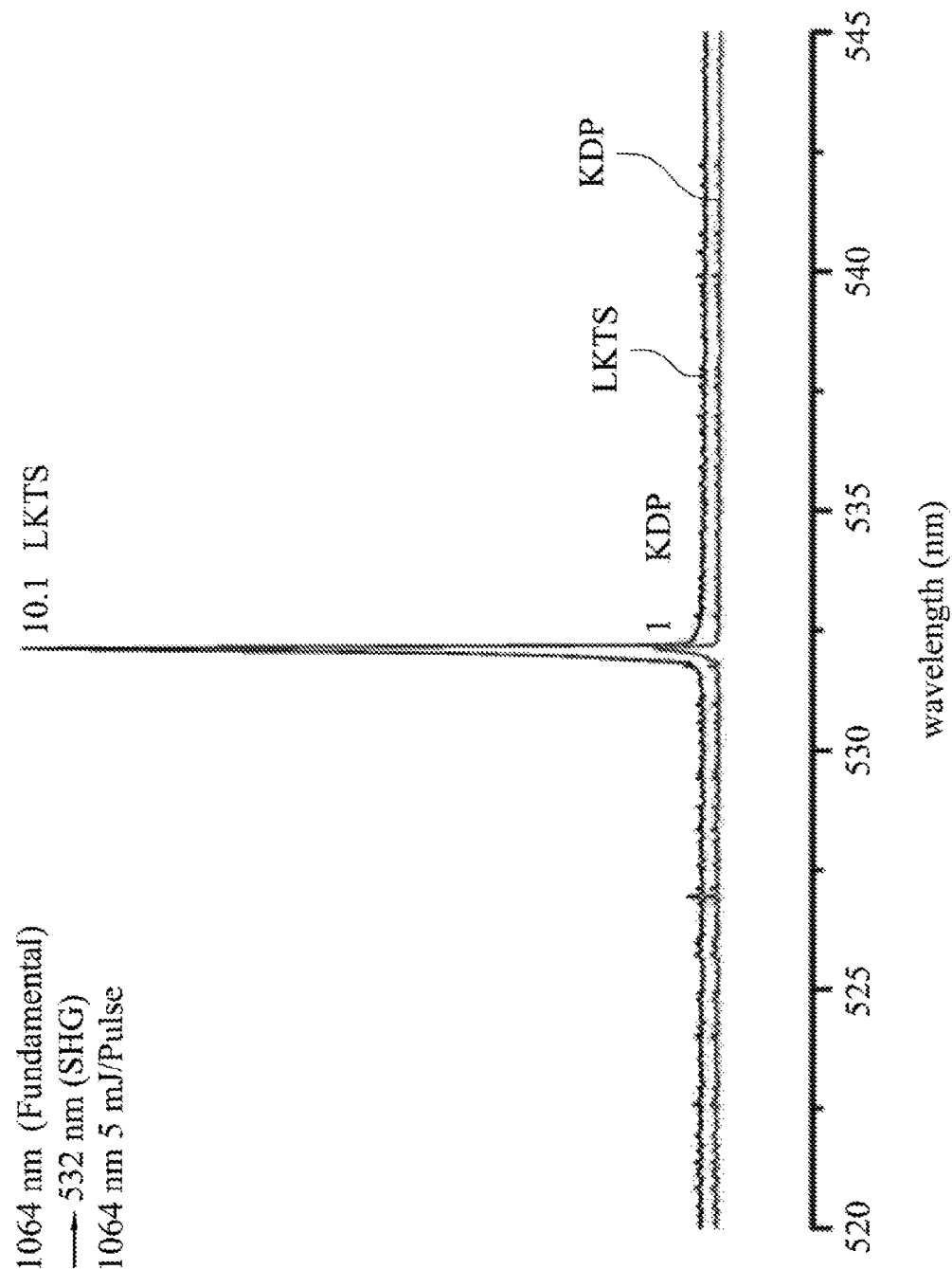
FIG. 4A is the second harmonic generation spectra of the nonlinear optical crystal $Li_2K_4TiOSi_4O_{12}$ and $KH_2PO_4$ (KDP), in accordance with some embodiments of the present invention.
Figure 4B:
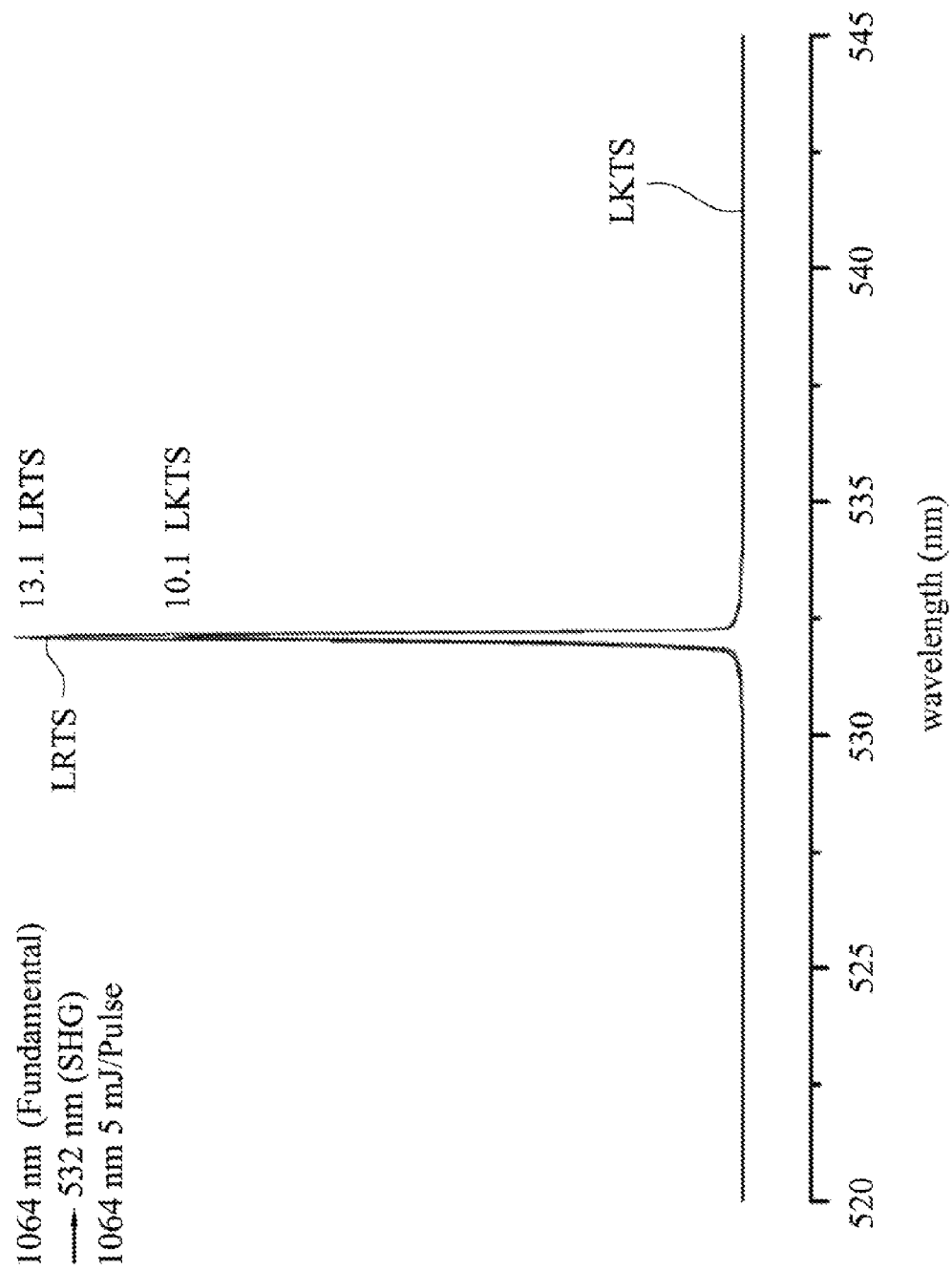
FIG. 4B is the second harmonic generation spectra of the nonlinear optical crystals, $Li_2K_4TiOSi_4O_{12}$ and $Li_2Rb_4TiOSi_4O_{12}$, in accordance with some embodiments of the present invention.

FIG. 4A is the second harmonic generation spectra of the nonlinear optical crystal $Li_2K_4TiOSi_4O_{12}$, in accordance with some embodiments of the present invention and the crystal $KH_2PO_4$ (KDP). FIG. 4B is the second harmonic generation spectra of the nonlinear optical crystals $Li_2K_4TiOSi_4O_{12}$ and $Li_2Rb_4TiOSi_4O_{12}$, in accordance with some embodiments of the present invention. Second harmonic generation (SHG), or known as frequency doubling, essentially produces a new light source that its frequency is twice of the fundamental light. The light intensity obtained by doubling the frequency of the laser at 1064 nm wavelength via commercial KDP powder is defined as 1. As shown in FIG. 4A, the wavelength intensity of nonlinear optical crystal LKTS disclosed by the present invention is 10.1 in comparison with KDP. In FIG. 4B, the intensity of LRTS is known as 13.1. Thus LKTS and LRTS both can produce strong SHG signals.

Comparing the laser-induced damage threshold of the nonlinear optical crystal of the present invention with commercial nonlinear optical crystals to test whether the nonlinear optical crystals of the present invention can be applied to high power laser without damage. From the experimental results, the laser-induced damage threshold of LKTS and LRTS of the present invention is high than 1.2 $GW/cm^2$, which is much higher than the current commonly used commercial nonlinear optical crystals, such as 0.4 $GW/cm^2$ of $KTiOPO_4$ (KTP), 0.5 $GW/cm^2$ of $\beta$-$BaB_2O_4$ (BBO) and 5 $GW/cm^2$ of KDP. In addition, LKTS and LRTS are stable up to 700° C. based on the results from high-temperature DSC/TGA measurements.

In accordance with embodiments of the present invention, a new nonlinear optical crystal is provided, chemical formula of the nonlinear optical crystal is $Li_2X_4TiOSi_4O_{12}$, wherein X=K or Rb; the nonlinear optical crystal belongs to tetragonal system, space group is P4nc, Z=2. The unit cell parameters of $Li_2K_4TiOSi_4O_{12}$ are a=b=11.3336(5) Å, c=5.0017(2) Å; and the unit cell parameters of $Li_2Rb_4TiOSi_4O_{12}$ are a=b=11.5038(6) Å, c=5.1435(3) Å.

In accordance with embodiments of the present invention, a method of manufacturing a nonlinear optical crystal including mixing LiF. XF, $TiO_2$ and $SiO_2$ to form a first starting reagent; heating the first starting reagent to a first temperature to melt the first starting reagent and to react; and cooling down the first starting reagent from the first temperature to a second temperature to crystallize a nonlinear optical material represented by the formula $Li_2X_4TiOSi_4O_{12}$, wherein X=K or Rb.

In accordance with embodiments of the present invention, a method of manufacturing a nonlinear optical crystal is provided, including mixing $LiOH.H_2O$, KOH, $TiO_2$, $SiO_2$ and $H_2O$ to form a second starting reagent; heating the second starting reagent to a third temperature to undergo a hydrothermal reaction at the third temperature to form a supersaturated solution comprising $Li_2K_4TiOSi_4O_{12}$; and cooling down the second starting reagent from the third temperature to a fourth temperature to crystallize a nonlinear optical material represented by the formula $Li_2K_4TiOSi_4O_{12}$.

The advantage of the embodiments of the present disclosure is to provide a new nonlinear optical crystal. The nonlinear optical crystal material is easy to synthesize, thermally stable up to 700° C., generates strong second harmonic generation with high laser-induced damage threshold.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A nonlinear optical crystal of a formula $Li_2X_4TiOSi_4O_{12}$, wherein X=K or Rb.

2. A nonlinear optical crystal of a formula $Li_2K_4TiOSi_4O_{12}$, wherein the nonlinear optical crystal belongs to tetragonal system, space group thereof is P4nc, Z=2 and unit cell parameters are a=b=11.3336(5) Å, c=5.0017(2) Å.

3. A nonlinear optical crystal of a formula $Li_2Rb_4TiOSi_4O_{12}$, wherein the nonlinear optical crystal belongs to tetragonal system, space group thereof is P4nc, Z=2 and unit cell parameters are a=b=11.5038(6) Å, c=5.1435(3) Å.

4. A method of manufacturing a nonlinear optical crystal, comprising:
   mixing LiF, XF, $TiO_2$ and $SiO_2$ to form a first starting reagent, wherein X=K or Rb;
   heating the first starting reagent to a first temperature to melt the first starting reagent and undergo a reaction; and
   cooling down the first starting reagent from the first temperature to a second temperature to crystallize a nonlinear optical material represented by a formula $Li_2X_4TiOSi_4O_{12}$.

5. The method for manufacturing the nonlinear optical crystal according to claim 4, wherein a molar ratio of Li:K:Ti:Si in the first starting reagent is a:b:1:1-4, wherein a and b are between 10-30.

6. The method for manufacturing the nonlinear optical crystal according to claim 4, wherein a molar ratio of Li:Rb:Ti:Si in the first starting reagent is c:d:1:1-4, wherein c and d are between 10-30.

7. The method for manufacturing the nonlinear optical crystal according to claim 4, wherein the first temperature is between 650° C. and 900° C., and the second temperature is between 550° C. and 700° C.

8. A method of manufacturing a nonlinear optical crystal, comprising:
   mixing $LiOH.H_2O$, $KOH$, $TiO_2$, $SiO_2$ and $H_2O$ to form a second starting reagent;
   heating the second starting reagent to a third temperature to undergo a hydrothermal reaction at the third temperature to form a supersaturated solution comprising $Li_2K_4TiOSi_4O_{12}$; and
   cooling down the second starting reagent from the third temperature to a fourth temperature to crystallize a nonlinear optical material represented by a formula $Li_2K_4TiOSi_4O_{12}$.

9. The method for manufacturing the nonlinear optical crystal according to claim 8, wherein a molar ratio of $LiOH.H_2O$:$KOH$:$TiO_2$:$SiO_2$:$H_2O$ in the second starting reagent is 2:10:1:4:10.

10. The method for manufacturing the nonlinear optical crystal according to claim 8, wherein the third temperature is between 450° C. and 550° C. and the fourth temperature is between 300° C. and 350° C.

* * * * *